(12) United States Patent  
Kim et al.

(10) Patent No.: US 8,898,255 B2
(45) Date of Patent: Nov. 25, 2014

(54) NETWORK DIGITAL SIGNAGE SOLUTION

(75) Inventors: DongWook Kim, San Diego, CA (US); Agnihotri Tanmay, San Diego, CA (US); Ron Diaz, San Diego, CA (US)

(73) Assignee: Sony Corporation, Tokyo (JP)

( * ) Notice: Subject to any disclaimer, the term of this patent is extended or adjusted under 35 U.S.C. 154(b) by 268 days.

(21) Appl. No.: 13/099,336

(22) Filed: May 2, 2011

(65) Prior Publication Data

US 2012/0114336 A1   May 10, 2012

Related U.S. Application Data

(60) Provisional application No. 61/411,152, filed on Nov. 8, 2010.

(51) Int. Cl.
| | | |
|---|---|---|
| G06Q 30/00 | (2012.01) |
| G06F 15/16 | (2006.01) |
| A63F 13/00 | (2014.01) |
| F21V 5/00 | (2006.01) |
| H04N 21/414 | (2011.01) |
| H04N 21/4227 | (2011.01) |
| H04N 21/433 | (2011.01) |
| H04N 21/482 | (2011.01) |
| G06Q 30/02 | (2012.01) |

(52) U.S. Cl.
CPC ..... *H04N 21/41415* (2013.01); *H04N 21/4227* (2013.01); *H04N 21/4332* (2013.01); *H04N 21/4825* (2013.01); *G06Q 30/0241* (2013.01); *A63F 2300/206* (2013.01)
USPC ............ 709/218; 705/14.4; 463/43; 362/559

(58) Field of Classification Search
USPC ...................................................... 705/14.4
See application file for complete search history.

(56) References Cited

U.S. PATENT DOCUMENTS

| 7,020,704 | B1* | 3/2006 | Lipscomb et al. ............. 709/226 |
| 7,797,374 | B2 | 9/2010 | Prince |
| 7,822,344 | B1 | 10/2010 | Jachetta et al. |
| 2003/0160734 | A1 | 8/2003 | Rogers |
| 2005/0166220 | A1 | 7/2005 | McKay |
| 2006/0015531 | A1 | 1/2006 | Fraind et al. |
| 2006/0248192 | A1 | 11/2006 | Morris, III et al. |
| 2007/0011050 | A1 | 1/2007 | Klopf et al. |
| 2007/0050372 | A1 | 3/2007 | Boyle |
| 2007/0136133 | A1 | 6/2007 | Li |
| 2007/0252891 | A1 | 11/2007 | Gurley |

(Continued)

OTHER PUBLICATIONS

"Display Technologies Guide (LCD, Plasma, DLP, LCoS, D-ILA, CRT", Audioholics Online A/V Magazine, Jun. 12, 2008, on line at audioholics.com/education/display-formats-technology/display-technologies-guide-lcd-plasma-dlp-lcos-d-ila-crt.*

(Continued)

*Primary Examiner* — John G Weiss
*Assistant Examiner* — Scott C Anderson
(74) *Attorney, Agent, or Firm* — Fitch, Even, Tabin & Flannery LLP (57) ABSTRACT

The present invention relates to a network based digital signage apparatus and a method for causing the digital signage apparatus to retrieve content from a remote server, for use in displaying content thereon. By utilizing a computer network to cause a digital signage device to remotely retrieve and store and/or display content, the instant invention potentially offers significant cost savings over the use of traditional digital signage systems that require separate media player and controller hardware.

21 Claims, 6 Drawing Sheets

(56) References Cited

U.S. PATENT DOCUMENTS

| | | |
|---|---|---|
| 2007/0282898 A1 | 12/2007 | Stark et al. |
| 2008/0212944 A1* | 9/2008 | Khedouri et al. ............. 386/124 |
| 2008/0270155 A1* | 10/2008 | Reuveni ........................... 705/1 |
| 2009/0193452 A1* | 7/2009 | Russ et al. ...................... 725/31 |
| 2009/0217084 A1 | 8/2009 | Ebbert et al. |
| 2009/0300028 A1 | 12/2009 | Ben Natan |
| 2009/0313659 A1 | 12/2009 | Samuels |
| 2010/0106803 A1 | 4/2010 | Strand |
| 2010/0122172 A1 | 5/2010 | Mongeau et al. |
| 2010/0318419 A1 | 12/2010 | Veiri |

OTHER PUBLICATIONS

Adams et al., "An infrared network for mobile computers", Proceedings of the USENIX Symposium on Mobile & Location—independent Computing, Aug. 1993, p. 2.*

* cited by examiner

NETWORK DIGITAL SIGNAGE SOLUTION

This application claims the benefit of U.S. Provisional Application No. 61/411,152, filed Nov. 8, 2010, which is incorporated herein by reference.

FIELD OF INVENTION

The present invention relates to a method and apparatus for facilitating the remote display of content. In particular, this invention involves a method and apparatus for use in remotely retrieving, managing and displaying content via a network based digital signage device.

BACKGROUND OF THE INVENTION

Digital signage is a form of electronic display that shows information, advertising and other messages. Conventional digital signs (such as LCD, LED, plasma displays, or projected images etc.) are often found in public and private environments, such as retail stores and corporate buildings. The benefits of digital signage over static signs, in situations where changing signs are preferred over static signs, are that the content can be easily changed, animations can be shown, and the digital signage display can be adapted to the context and the audience, even interactively. In many applications, digital signage advertising offers advantages over traditional advertising because digital advertisements are often cheaper to generate, and can be used to display unlimited content, as opposed to paper advertising. Thus, in many scenarios, digital signage can offer a superior return on investment as compared to temporary and/or promotional signs made from other substrates.

In recent years, the market for public information displays has evolved considerably to include full motion video content combined with images and text displayed on high-resolution video graphics screens. As hardware prices decline, it is becoming more and more common to see digital signage systems in shopping centers, hotels, university campuses and corporate lobbies etc. However, conventional digital signage devices typically rely on the use of separate audio/video equipment for pushing the desired content to the digital display device. For example, traditional digital signage systems often require a separate controller box and/or media player (such as a DVD player) to push content to the signage device and/or to manage the display of content. Thus, especially for applications where multiple digital signage devices are desired, the initial investment in the digital signage systems (and supporting hardware), can be quite high. In addition to high initial hardware costs, because conventional digital signage systems often require multiple connections to one or more controller box and/or media player, the installation and maintenance of such systems is often difficult and costly.

BRIEF SUMMARY OF THE INVENTION

Several embodiments of the present invention answer the above and other needs by providing a method and apparatus for a remotely managed, network based digital signage device.

One embodiment of the present invention includes: a housing; a display screen mechanically coupled to the housing and electrically coupled to a microprocessor; an infrared (IR) receiver mechanically coupled to the housing and electrically coupled to the microprocessor, wherein the IR receiver is configured to receive optical signaling from a handheld control unit; a network interface mechanically coupled to the housing and electrically coupled to the microprocessor, wherein the network interface is configured to receive one or more control commands via a network and wherein the one or more control commands originate from a remote device; and a first memory electrically coupled to the microprocessor, the first memory storing a control program readable and executable by the microprocessor to cause the microprocessor to process the one or more control commands, and wherein the control program is further configured to cause the microprocessor to initiate communication with a content server in response to the received one or more control commands, wherein the content server is separate from the remote device.

In yet another embodiment, the present invention comprises a method, the method comprising the steps of: receiving, at the digital signage device, one or more control commands, wherein the one or more control commands originate from a remote device and are received by the digital signage device via a network; communicating with a content server via the network, in response to the received one or more control commands, wherein the content server comprises content for playback on the digital signage device and wherein the content server is separate from the remote device; retrieving at least a portion of the content on the content server in response to the received one or more control commands; and displaying at least a portion of the retrieved content on a display screen, wherein the display screen is mechanically coupled to the digital signage device and wherein the content comprises one or more of the following: image information, video information, or audio information.

BRIEF DESCRIPTION OF THE DRAWINGS

The accompanying drawings, which are included to provide further understanding of the disclosure and are incorporated in and constitute a part of this specification, illustrate embodiments of the disclosure and, together with the description, serve to explain the principles of the disclosure.

DETAILED DESCRIPTION

Reference will now be made in detail to certain embodiments of the present disclosure, examples of which are illustrated in the accompanying figures. It is to be understood that the figures and descriptions of the present disclosure included herein illustrate and describe elements that are of particular relevance to the present disclosure, while eliminating, for the sake of clarity, other elements found in conventional digital signage systems.

Figure 1:
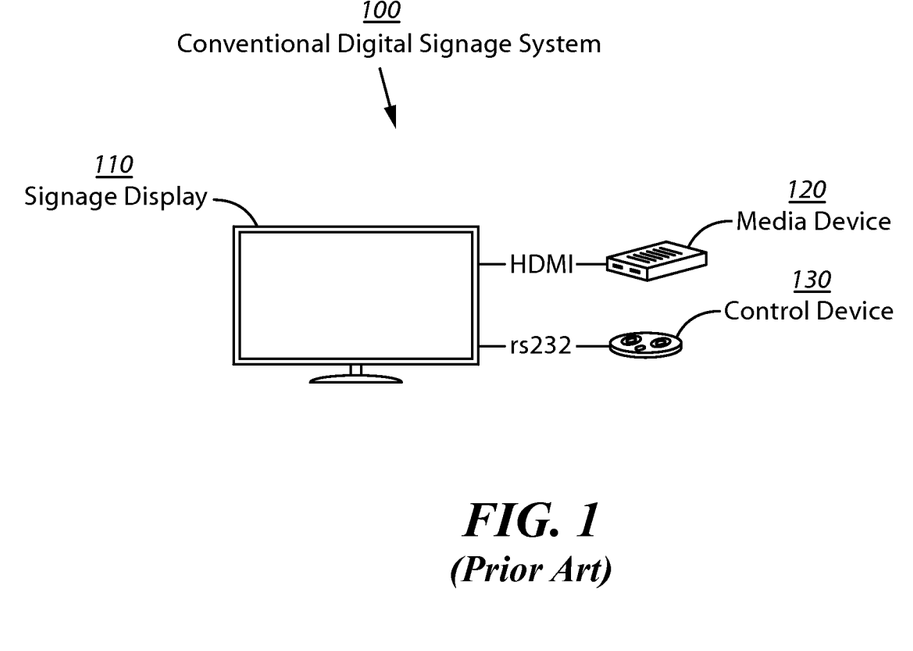
FIG. 1 depicts a conventional digital signage system.

FIG. 1 illustrates a prior art digital signage system 100 which includes a signage display 110, a media device 120 and a control device 130. As depicted in FIG. 1, conventional digital signage systems usually include a signage display 110 that is connected to an external media device 120 and/or a control device 130.

In practice, the signage display 110 of the conventional digital signage system 100 will be connected to the media device 120 and control device 130, via a wired connection, such as via standard audio/video or HDMI cables etc. As depicted in FIG. 1, the media device 120 and control device 130 are connected to the signage display 110 with a wired HDMI connection and a wired RS232 connection, respectively. In prior art digital signage systems, such as that pictured in FIG. 1, the media device 120 typically comprises a media player such as a BluRay disc or DVD player that is configured to push content to the signage display 110.

In conventional push-technologies, such as that typified in the topology depicted in FIG. 1, the request for content and subsequent content transaction is initiated at the media device 120. For example, a user may cause content to be pushed from the media device 120, to the signage display 110 by initiating playback of content on the media device 120 (e.g. a DVD player, BluRay disc player etc.), and using the signage display 110 to merely display the received content. Furthermore, in conventional digital signage systems such as that depicted in FIG. 1, management and scheduling of displayed content may be controlled via an external control device 130. That is, content scheduling and playback is managed by a control device 130 used to control the display of content pushed from the media device 120.

Figure 2:
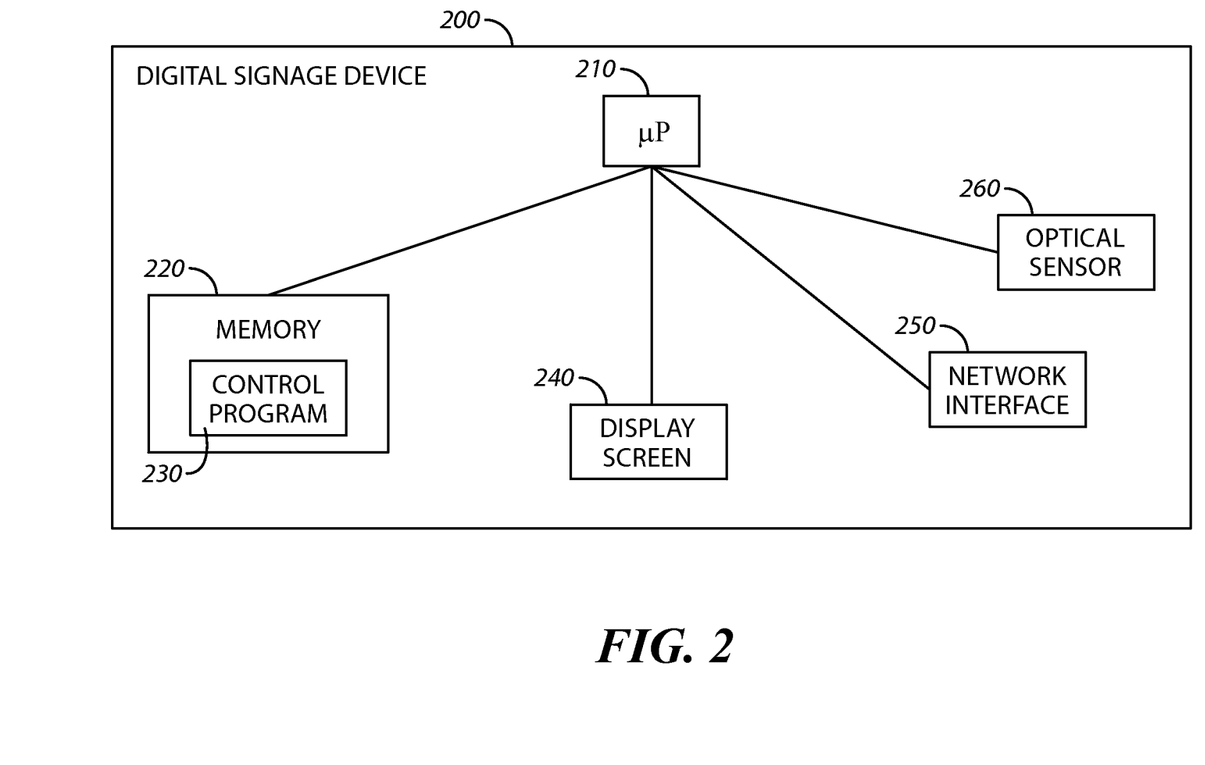
FIG. 2 depicts a block diagram of the components of a digital signage device according to one embodiment of the present invention.

FIG. 2 illustrates a block diagram of a digital signage device according to one embodiment of the present invention. Shown in FIG. 2 are: a digital signage device 200, comprising: a microprocessor 210, a memory 220 containing a control program 230 stored thereon, a display screen 240, a network interface 250 and an optical sensor 260. As depicted in FIG. 2, the microprocessor 210 is electrically coupled to the memory 220; the microprocessor is also electrically coupled to the display screen 240, the network interface 250 and the optical sensor 260. The memory 220 contains the control program 230 stored thereon which is executable by the microprocessor 210 for carrying out various features of the instant invention as will be described in further detail, below. The memory 220 may comprise essentially any type of tangible, machine readable memory device. By way of example, the memory could comprise essentially any type of RAM, DRAM, ROM, USB memory or magnetic or flash based memory etc.

The display screen 240 may comprise essentially any type of color or monochromatic display device suitable for carrying out the features of the instant invention. By way of example, the display screen 240 may include, but is not limited to, LED, LCD, OLED, plasma or projection based displays. In some embodiments of the invention, the display screen 240 will comprise a high definition color display.

In preferred embodiments, the microprocessor 210, the memory 220 (containing a control program 230 stored thereon), display screen 240 and the network interface 250 will be cooperated with a housing (not shown) for use in forming the digital signage device 200. In some embodiments, the housing will be further cooperated with an optical sensor 260 for use in receiving optical signals. For example, the optical sensor 260 may comprise an infra-red (IR) based sensor for receiving light based signals from a hand held control device, such as a television remote control.

In preferred embodiments of the present invention, the network interface 250 is configured to communicate with a computer network such as a WAN, LAN or the internet; however, the network interface 250 could be configured to communicate with essentially any remote electronic device via either a wired or wireless connection. As will be discussed in further detail below, the network interface is configured for bi-directional communication for use in sending/receiving control commands and other information over a network, as illustrated in FIG. 3.

Figure 3:
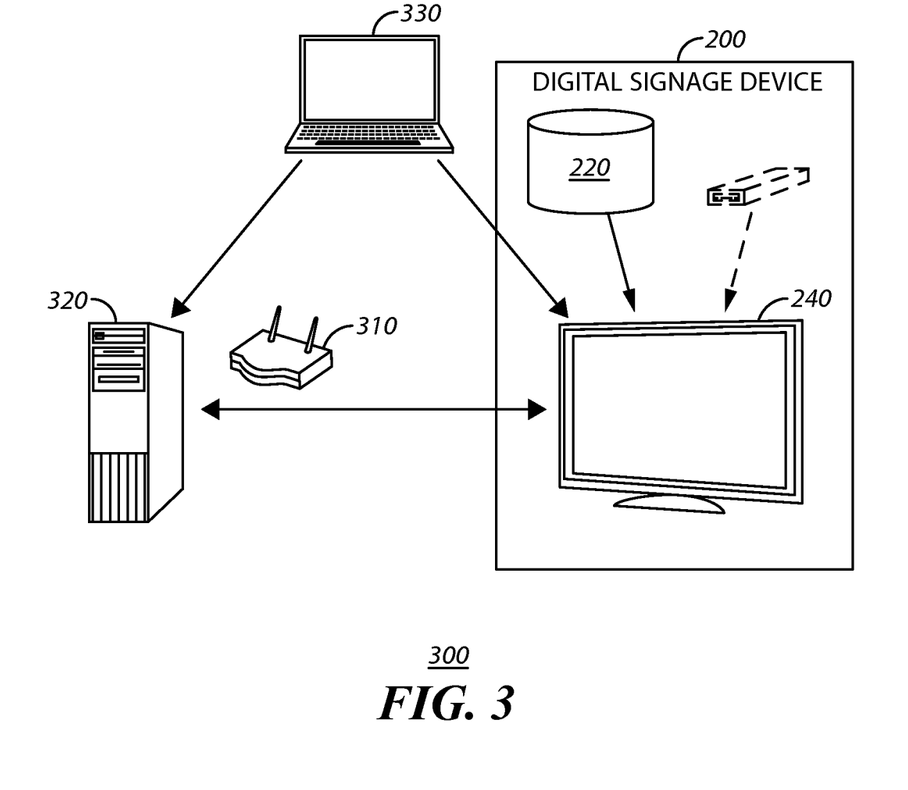
FIG. 3 illustrates a digital signage system according to one embodiment of the invention.

FIG. 3 depicts a digital signage system 300 according to one preferred embodiment of the invention. Specifically, the digital signage system 300 comprises: the digital signage device 200, a network 310, a contents server 320 and a remote device 330. In one preferred embodiment of the present invention, the component portions of the digital signage device 200 are physically cooperated; that is, the microprocessor 210, memory 220 (containing the control program 230), display screen 240 and network interface 250 are all physically cooperated into the digital signage device 200.

As depicted by FIG. 3, the digital signage device 200, contents server 320 and remote device 330 are all connected to the network 310. As illustrated, the network 310 may be either a wired or wireless network, or the connection from the digital signage device 200, content server 320 and remote device 330 to the network may be accomplished using an intermediary network device such as a wireless router or switch. As further depicted in FIG. 3, in some embodiments the memory 220 of digital signage device 200 comprises an internal storage device; however, in other embodiments the memory may be a removable memory device such as a USB memory stick.

The contents server 320 may comprise essentially any processor based network device that is capable storing content and transmitting content over the network 310. By way of example, the contents server 320 may comprise, but is not limited to, a PC, web server, ftp server, game console system or network based memory device. Additionally, the content stored on the contents server 320 may comprise essentially any type of multimedia information, including but not limited to audio, video or image information etc.

The remote device 330 may comprise essentially any processor based device capable of communicating with the digital signage device 200 via the network 310. By way of example, the remote device may comprise a PC, tablet based mobile device, entertainment system or network capable mobile device such as a smart phone or PDA.

In practice, the digital signage device 200 will receive one or more control commands from the remote device 330, via the network 310. In preferred embodiments of the invention, these received control commands will cause the control program 230 (using microprocessor 210), to execute steps to retrieve content from the content server 320. That is, microprocessor 210 will pull content from the content server 320 to the digital signage device 200.

In one embodiment of the present invention, receipt of control commands from remote device 330 will cause the digital signage device 200 to retrieve at least a portion of the content available on the content server 320. Under control of control program 230, microprocessor 210 will store at least a portion of the retrieved content to the memory 220. In preferred embodiments, stored content may be read, re-written or deleted by microprocessor 210 in conjunction with control command instructions received via the network 310.

In another embodiment of the present invention, microprocessor 210 will cause the retrieval of content from the content server 320 without storage to the memory 220. That is, in accordance with control commands received via the network, 310, the digital signage device 200 will initiate the streaming of at least a portion of the content on the content server 320 to the digital signage device 200. In preferred embodiments, content streamed from the content server 320 to the digital signage device will be used for immediate (or near immediate) processing and/or playback on the display screen 240. As will be discussed in further detail below, content management and playback scheduling can be coordinated with the playlist in accordance with control commands received from the remote device 330.

In yet another embodiment of the present invention, the content server 320 may be configured to perform the above described functions of remote device 330, i.e., sending and receiving control signals to the digital signage device 200. In this configuration, the need for having a separate remote device 330 connected to network 310 will be eliminated. Such configurations may offer significant cost advantages in scenarios where additional signage devices 200 are to be added.

In practice, the digital signage device 200 will receive one or more control commands from the content server 320, via the network 310. These received control commands will cause the control program 230 (using microprocessor 210), to execute steps to retrieve content from the content server 320. That is, microprocessor 210 will pull content from the content server 320 to the digital signage device 200.

In one embodiment, receipt of one or more control commands from the content server 320 will cause the digital signage device 200 to retrieve at least a portion of the content available on the content server 320. Under control of control program 230, microprocessor 210 will store at least a portion of the retrieved content to the memory 220. In preferred embodiments, stored content may be read, re-written or deleted by microprocessor 210 in conjunction with control command instructions received via the network 310.

In another embodiment of the present invention, microprocessor 210 will cause the retrieval of content from the content server 320 without causing the retrieved content to be stored to the memory 220. That is, in accordance with control commands received via the network 310, the digital signage device 200 will initiate the streaming of at least a portion of the content on the content server 320 to the digital signage device 200. The content streamed from the content server 320 to the digital signage device will be used for immediate (or near immediate) processing and/or playback on the display screen 240. As will be discussed in further detail below, content management and playback scheduling may also be coordinated with the playlist in accordance with control commands received from the content server 320.

Figure 4:
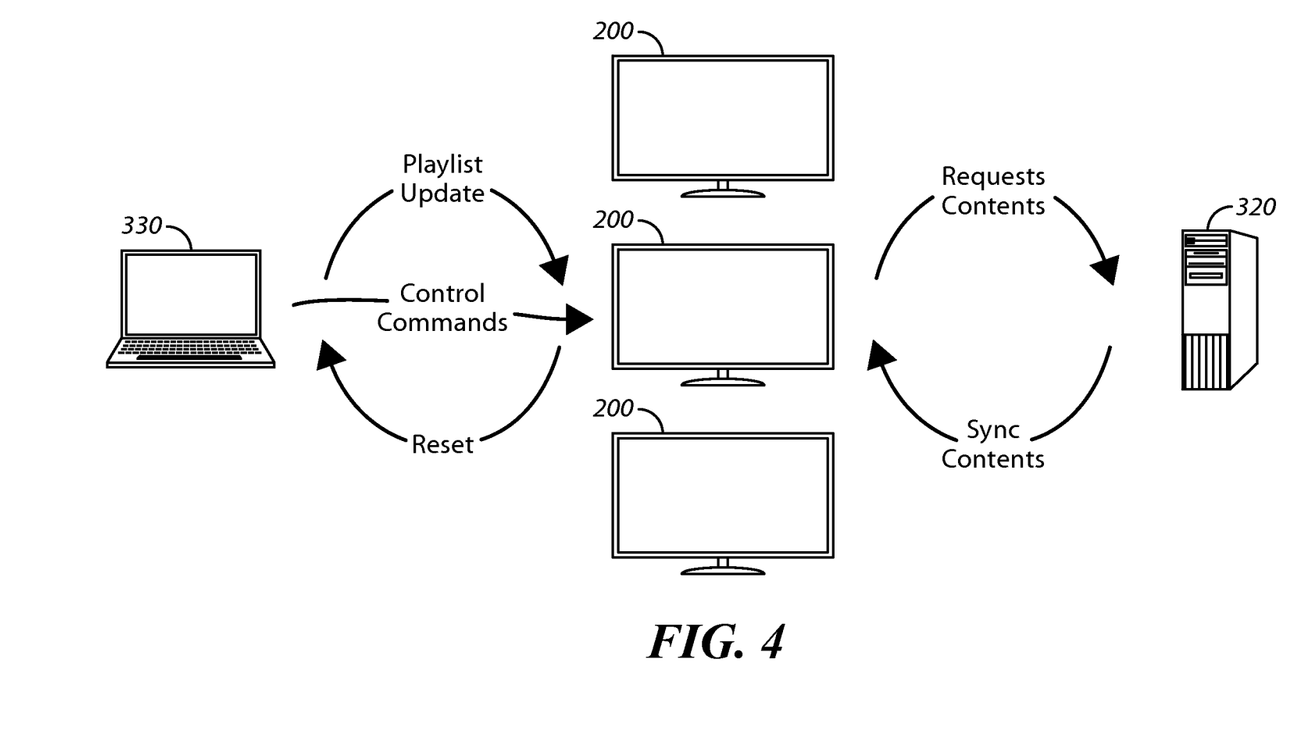
FIG. 4 illustrates a digital signage system comprising multiple displays according to one preferred embodiment of the present invention.

FIG. 4 depicts the topology of a digital signage system 300 according to another preferred embodiment of the invention. For example, in some embodiments, the digital signage system 300 may comprise more than one digital signage device 200. The content server 320, remote device 330 and digital signage devices 200, are communicated with the network 310 (not shown) such that each of the digital signage devices 200 can communicate with the content server 320 and remote device 330. By way of example, each of the digital signage devices 200 may receive control commands from the remote device 330 causing the digital signage devices to request content from the content server 320. In response to this request, content is synced as between each of the digital signage devices 200 and the content server 320. In some embodiments, the content delivered to each individual digital signage device may vary. In some embodiments, certain of the individual signage devices may stream content from the content server 320, whereas others of the individual signage devices may store received content on the memory for later access and display.

In preferred embodiments of the instant invention, the remote device 330 will further send control commands to control the management and playback of content on the digital signage device/s 200 using one or more playlists. For example, a user operating the remote device 330 may send control commands to one or more of the digital signage devices 200 to add, edit/update or delete a playlist on the one or more signage device/s 200. As will be understood by those of skill in the art, one or more playlists on the one or more digital signage device/s may be use to manage the scheduling and playback of the content received from the content server.

Figure 5:
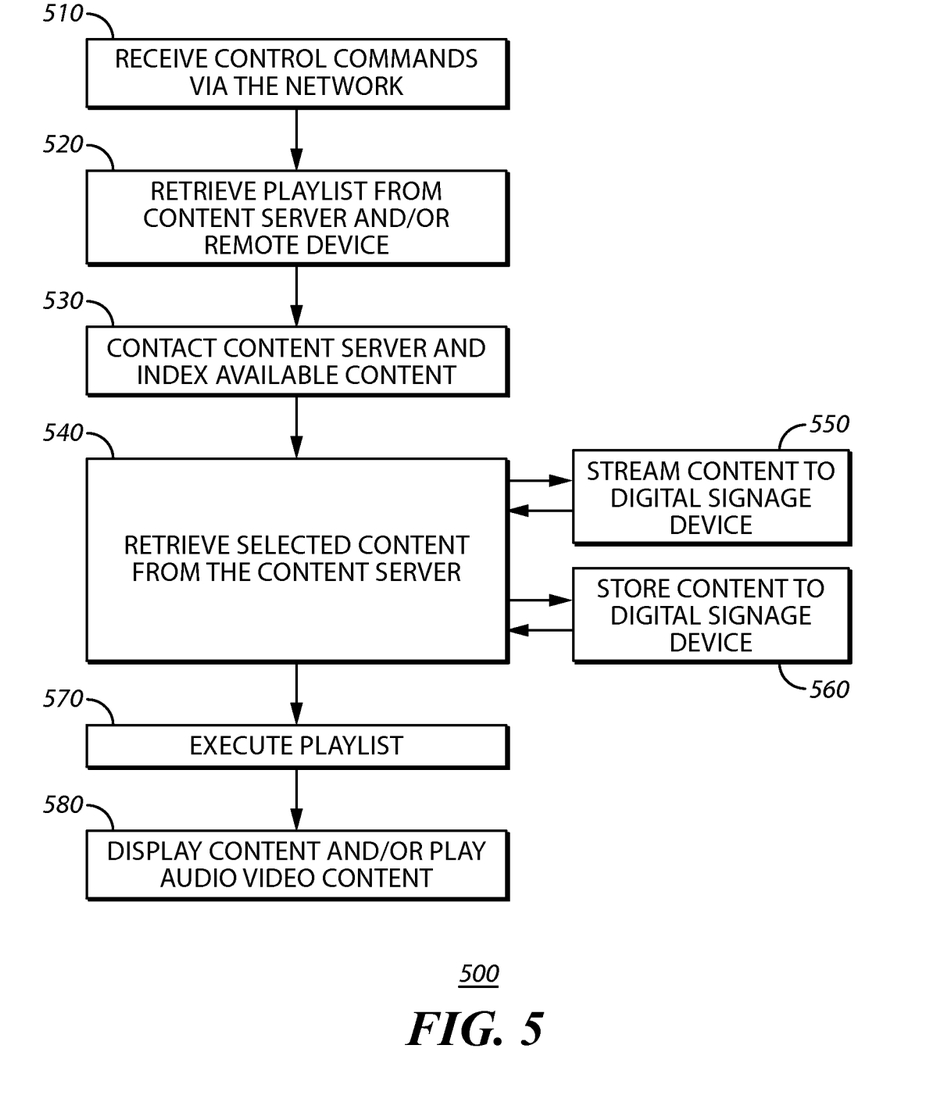
FIG. 5 depicts a block diagram for carrying out the steps of a method for retrieving and displaying content according to one preferred embodiment of the invention.

FIG. 5 depicts a block diagram illustrating the steps of a method 500 executed by control program 230 using microprocessor 210, on digital signage device 200 according to one embodiment of the instant invention. Although the following steps make reference to the execution of the method 500 on one digital signage device 200, one of skill in the art would appreciate that the method 500 could be carried out on two or more devices on the same or separate networks. In step 510, the digital signage device/s receive one or more control commands via the network 310. The control commands of step 510 comprise multiple instructions, executable by the microprocessor 210, for use in retrieving and managing content from the content server 320. However, in various embodiments, the received control commands may consist of either content management instructions or content retrieval instructions (at the exclusion of the other).

In step 520, a playlist is created at remote device 330 and then downloaded to digital signage device 200 for execution thereon. In embodiments wherein the content server 320 may control operation of the digital signage device 200, the control signals may originate from the content server 320, without the need for a separate remote device 330. By way of example, the content server 320 and/or remote device 330 may be used to create one or more playlists that include content items of virtually any type, including but not limited to, image, video and audio information. Additionally, playlists may be created to provide sophisticated scheduling for the playback of different content items. For example, playlist scheduling may enable the playback of a particular content item between two arbitrary points in time before proceeding to the next content item.

Proceeding to step 530, control program 230 causes the digital signage device to contact the content server 320 and to index the available content provided by the content server 320. As discussed above, communication between the digital signage device 200 and the content server 320 may occur using either a wired or wireless network 310.

In step 540, the received control commands cause the digital signage device to retrieve (or pull) content from the content server 320. In some embodiments, the content items to be retrieved may be specified in the playlist information of step 520. In alternative embodiments, the digital signage device 200 may simply retrieve all or a portion of the content on content server 320 in accordance with the instructions of the received control commands. Retrieved content items may either be streamed from the content server 320 to the digital signage device 200 or they may be stored on the memory 220 of the digital signage device 200. For example, in optional step 550, the content retrieved from the content server 320 is streamed to the digital signage device 200 such that the received content is processed and displayed on display screen 240 without storage to the memory 220. In another embodiment of the invention, according to optional step 560, the retrieved content of content server 320 is stored on the memory 220, before being accessed for playback by microprocessor 210.

In step 570, the playlist of step 520 is executed by microprocessor 210 to cause the playback of content received from content server 320. In step 580, the execution of the playlist will cause the display of images or video on the display screen 240 of digital signage device 200. In some embodiments, the execution of the playlist may cause the playback of audio information, either alone or in conjunction with, the playback of image and/or video information.

Figure 6:
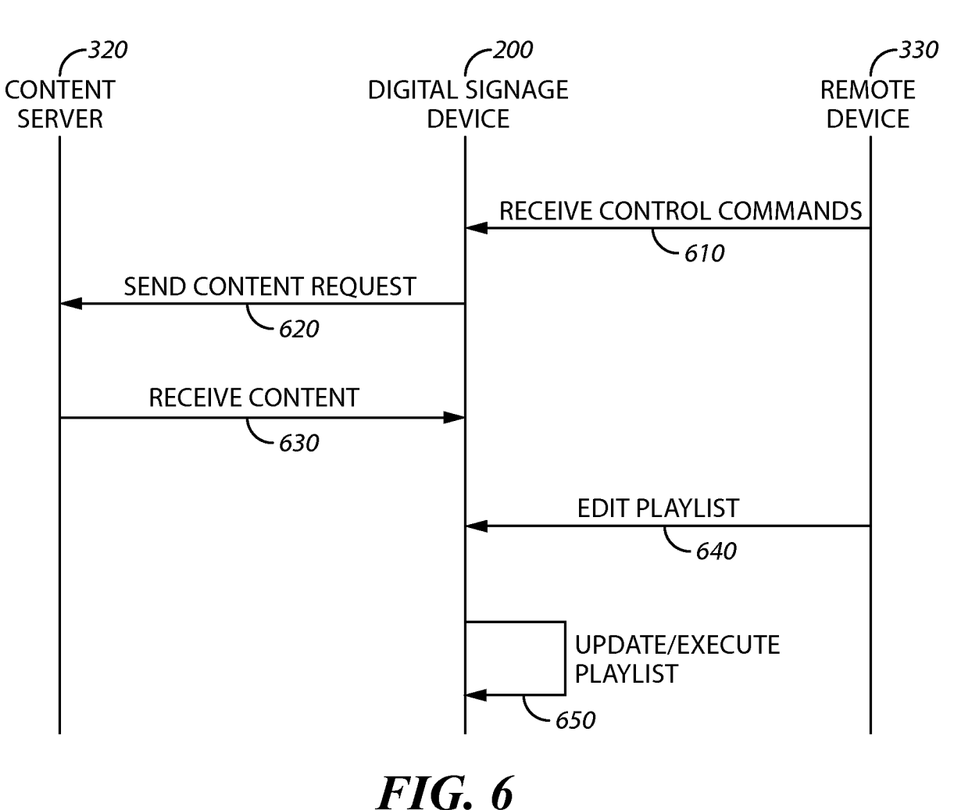
FIG. 6 is a diagram of signals sent over a network for carrying out some embodiments of the present invention.

FIG. 6 illustrates a flow diagram for the signaling steps of the digital signage system 300, according to one embodiment of the present invention. As depicted in FIG. 6, signaling is initiated by remote device 330 wherein control commands are sent to the digital signage device 200, in signaling step 610. The initial control commands transmitted to the digital signage device may include a multitude of instructions including on/off commands, status requests etc. Furthermore, control commands received by the digital signage device 200 may include essentially any type of control command. For example, received control commands may comprise virtually any type of instruction that may be transmitted via a television remote control (e.g. volume control, input switching, playback status updates, screen settings etc.).

In at least one preferred embodiment of the invention, the initial control commands received by the digital signage device will comprise instructions to retrieve content from the content server 320 and may comprise information regarding a virtual or web address of the content server and/or information regarding what content should be retrieved. In one preferred embodiment of the invention, the received control commands comprise instructions adapted to use JsonRPC protocols.

In some embodiments, after receiving the initial control commands the digital signage device will initiate communication with the content server 320. This communication may cause the content server 320 to perform a number of tasks; however, in one preferred embodiment the content server 320 will respond by transmitting requested content to the digital signage device 200. As depicted in signaling step 630, the digital signage device will receive the requested content from the content server 320, at which point the requested content may be either streamed or stored to memory 220 (not depicted). In signaling step 640, the digital signage device 200 receives additional control command signaling from the remote device 330. As illustrated, in one preferred embodiment, the received control commands will comprise instructions to edit/update a playlist stored on memory 220 of digital signage device 200. As illustrated in signaling step 650, in response to the received "edit playlist" control commands of signaling step 640, the digital signage device 200 may update and or execute one or more playlists.

The present invention has been described above in terms of a presently preferred embodiment so that an understanding of the present invention can be conveyed. There are, however, many configurations for the system not specifically described herein but with which the present invention is applicable. The present invention should therefore not be seen as limited to the particular embodiments described herein, but rather, it should be understood that the present invention has wide applicability with respect to track light systems generally. All modifications, variations, or equivalent arrangements and implementations that are within the scopes of the attached claims should therefore be considered within the scope of the invention.

The invention claimed is:

1. A digital signage device comprising:
a housing;
a display screen mechanically coupled to the housing and electrically coupled to a microprocessor;
an infrared (IR) receiver mechanically coupled to the housing and electrically coupled to the microprocessor, wherein the IR receiver is configured to receive optical signaling from a handheld control unit;
a remote device separate from the handheld control unit;
a network interface mechanically coupled to the housing and electrically coupled to the microprocessor, wherein the network interface is configured to receive one or more control commands via a network and wherein the one or more control commands originate from the remote device; and
a first memory electrically coupled to the microprocessor, the first memory storing a control program readable and executable by the microprocessor to cause the microprocessor to process the one or more control commands, and
wherein the control program is further configured to cause the microprocessor to initiate communication with a content server in response to the received one or more control commands, wherein the content server is separate from the remote device;
wherein the received one or more control commands further comprise instructions for editing a playlist;
wherein the control program is configured to store a plurality of content received from the content server on the first memory and display the plurality of content stored on the first memory according to an edited playlist;
wherein the digital signage device, the remote device, and the content server each communicates on the network; and
wherein the remote device is configured to send control commands over the network to a second digital signage device to cause the second digital signage device to initiate communication with the content server.

2. The digital signage device of claim 1, wherein the received one or more control commands further cause the microprocessor to retrieve content from the content server, wherein the content comprises one or more of the following: image information, video information, or audio information.

3. The digital signage device of claim 1, wherein the control program is further configured to manage the playback and display of at least a portion of the content.

4. The digital signage device of claim 2, wherein the control program causes the microprocessor to stream the content from the content server to the display screen.

5. The digital signage device of claim 2, wherein the control program causes the microprocessor to store the content to the first memory.

6. The digital signage device of claim 2, wherein the one or more control commands comprises information related to a playback schedule for controlling the playback of at least a portion of the content retrieved from the content server.

7. The digital signage device of claim 1, wherein the network interface communicates with the network using a wired connection.

8. The digital signage device of claim 1, wherein the network interface communicates with the network using a wireless connection.

9. The digital signage device of claim 1, wherein the display screen comprises a light-emitting diode (LED) display.

10. The digital signage device of claim 1, wherein the one or more control commands utilize a remote procedure code (RPC) protocol.

11. The system of claim 1, wherein the playlist is stored on the digital signage device.

12. The digital signage device of claim 1, wherein the network is the Internet.

13. The digital signage device of claim 1, wherein the remote device is a processor based device with a network adapter.

14. A method for managing the retrieval and playback of content on a digital signage device, the method comprising:
- receiving, at the digital signage device, one or more control commands, wherein the one or more control commands originate from a remote device and are received by the digital signage device via a network and wherein the received one or more control commands comprise instructions for editing a playlist;
- communicating with a content server via the network, in response to the received one or more control commands, wherein the content server comprises content for playback on the digital signage device and wherein the content server is separate from the remote device, separate from the handheld control unit;
- retrieving at least a portion of the content on the content server in response to the received one or more control commands;
- storing a plurality of content from the content server on a memory of the digital signage device;
- displaying at least a portion of the retrieved content on a display screen according to an edited playlist, wherein the display screen is mechanically coupled to the digital signage device and wherein the content comprises one or more of the following: image information, video information, or audio information;
- wherein the digital signage device, the remote device, and the content server each communicates on the network; and
- wherein the remote device is configured to send control commands over the network to a second digital signage device to cause the second digital signage device to initiate communication with the content server.

15. The method of claim 14, wherein the received one or more control commands further comprise instructions for creating a playlist for use in managing the displaying of at least a portion of the retrieved content.

16. The method of claim 14, wherein the retrieving step further comprises:
- streaming at least a portion of the content from the content server to the digital signage device.

17. The method of claim 14, wherein the retrieving step further comprises:
- storing at least a portion of the content from the content server to an internal memory of the digital signage device.

18. The method of claim 14, wherein the one or more control commands are received wirelessly via the network.

19. The method of claim 14, wherein the one or more control commands are received via a wired connection to the network.

20. The method of claim 14, wherein the digital signage device comprises a light-emitting diode (LED) display.

21. The method of claim 14, wherein the one or more control commands comprise instructions formatted according to a remote procedure code (RPC) protocol.

* * * * *

UNITED STATES PATENT AND TRADEMARK OFFICE
CERTIFICATE OF CORRECTION

| | | |
|---|---|---|
| PATENT NO. | : 8,898,255 B2 | Page 1 of 1 |
| APPLICATION NO. | : 13/099336 | |
| DATED | : November 25, 2014 | |
| INVENTOR(S) | : Kim et al. | |

It is certified that error appears in the above-identified patent and that said Letters Patent is hereby corrected as shown below:

On the TITLE PAGE:
Under Inventors, please change "Agnihotri Tanmay" to --Tanmay Agnihotri--.
In the CLAIMS:
Claim 11, column 8, line 64, delete "The system" and insert --The digital signage device--.

Signed and Sealed this
Twenty-eighth Day of April, 2015

Michelle K. Lee
*Director of the United States Patent and Trademark Office*